THOMAS W. MOORE.
Improvement in Bedstead-Fastenings.
No. 5,603. *Fig. 1.* Reissued Oct. 14, 1873.
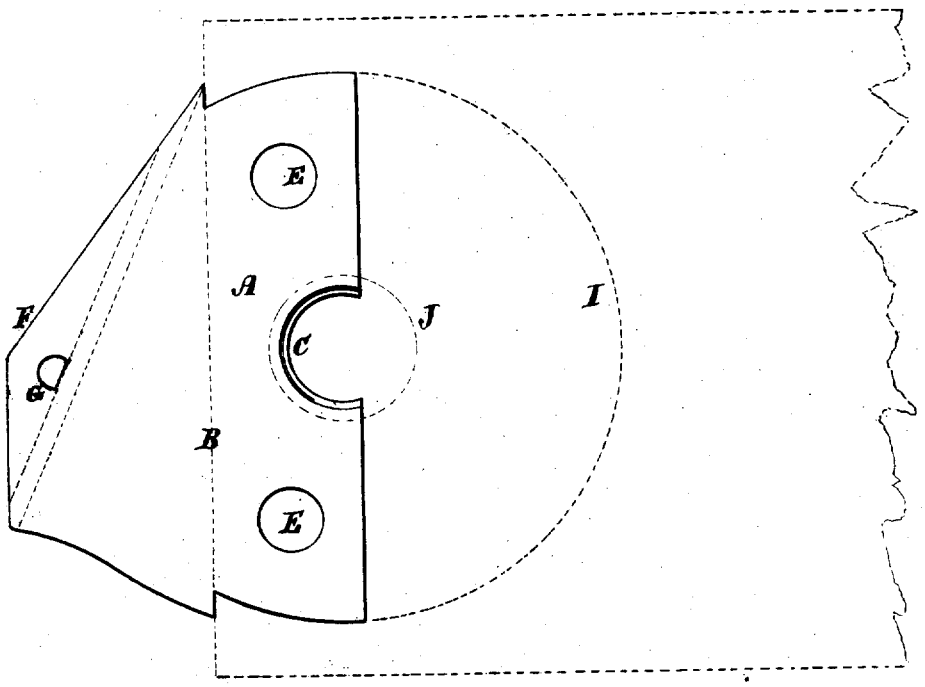
*Fig. 3.*
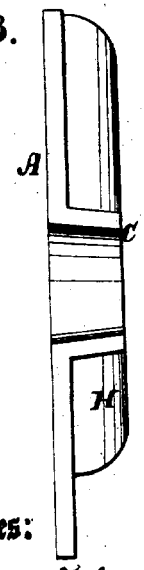
*Fig. 2.*
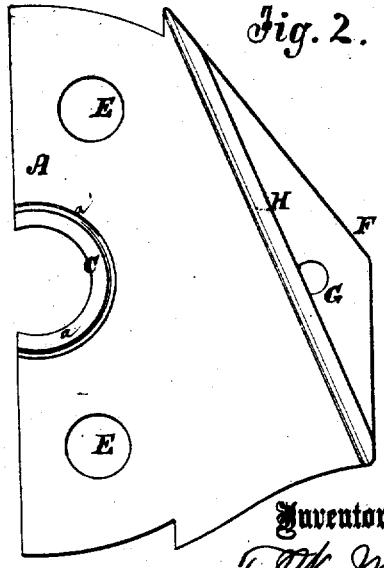
Witnesses:
A Bennenkendorf.
Geo W. Mabee
Inventor:
T. W. Moore
PER Munn & Co
Attorneys.
AM. PHOTO-LITHOGRAPHIC CO. N.Y. (OSBORNE'S PROCESS)

UNITED STATES PATENT OFFICE.

THOMAS W. MOORE, OF NEW YORK, N. Y., ASSIGNOR TO F. N. MOORE.

IMPROVEMENT IN BEDSTEAD-FASTENINGS.

Specification forming part of Letters Patent No. 127,786, dated June 11, 1872; reissue No. 5,603, dated October 14, 1873; application filed June 28, 1873.

*To all whom it may concern:*

Be it known that I, THOMAS W. MOORE, of the city, county, and State of New York, have invented a new and Improved Bedstead-Fastening, of which the following is a specification:

This invention relates to a new and useful improvement in the mode of attaching the cast fastening-plate to the rails of bedsteads; and it consists in the construction and arrangement of parts hereinafter described.

In the drawing, Figure 1 is a side view of the fastening-plate. Fig. 2 is a view showing the opposite side or fastening-flange. Fig. 3 is an edge view.

Similar letters of reference indicate corresponding parts.

A is the fastening-plate; C, a flange or hub for securing it to the rail, and H the flange for entering the post and engaging the slotted plate fitted in it for that purpose, or a slot without a plate. The fastening-plate A is let into the inside of the rail by a circular socket or recess formed in it, as indicated by the dotted line I, so that the joint end of the rail will be even with the line B of the drawing. The central hub or flange C of the plate is let into another circular recess or socket, J, formed in the center of recess I to securely fasten the plate to the rail. These plates will be very securely fastened against the great strain in the lengthwise direction of the rails to which they are subject by the central flange or hub in its recesses J. The part F of plate A enters the post, and is provided with a flange, H, at right angles to the plate, the plate being thus held to rail and post by hub C and flange H. The advantages of these two features of construction will be the same whatever be the particular form of plate A or of the hub; but I go a step further by making hub C arc-shaped, and the edges *a a* curved also on an arc of a true circle. These are made arcs of two concentric circles, thus allowing a single tool, with two corresponding blades, to perform the work of cutting out the recesses for the plate and hub at one operation. This is a matter of considerable importance in the manufacture of bedsteads, because the labor, which is a large measure of their cost, is thus only half what it would be for making these recesses if the arrangement was such that two special operations had to be performed to make them. The joint between the rail and post of the bedstead will be at the line B, as before stated. The balance of the plate enters the post, and the rail is held by the projecting flange H, or by any other suitable means.

Having thus described my invention, I claim as new and desire to secure by Letters Patent—

1. The plate A, having the edges *a* and the hub C made on arcs of concentric circles, as and for the purpose described.

2. The plate A, provided with the projection F and flange H, having the form shown, and for the purpose specified.

THOMAS W. MOORE.

Witnesses:

A. P. THAYER,

JOHN S. BROWN.